March 28, 1967 K. G. ÅHLEN 3,311,000
TRANSMISSION, PREFERABLY FOR VEHICLES
Filed Sept. 19, 1963 11 Sheets-Sheet 1

INVENTOR
Karl Gustav Åhlen
BY
his ATTORNEY

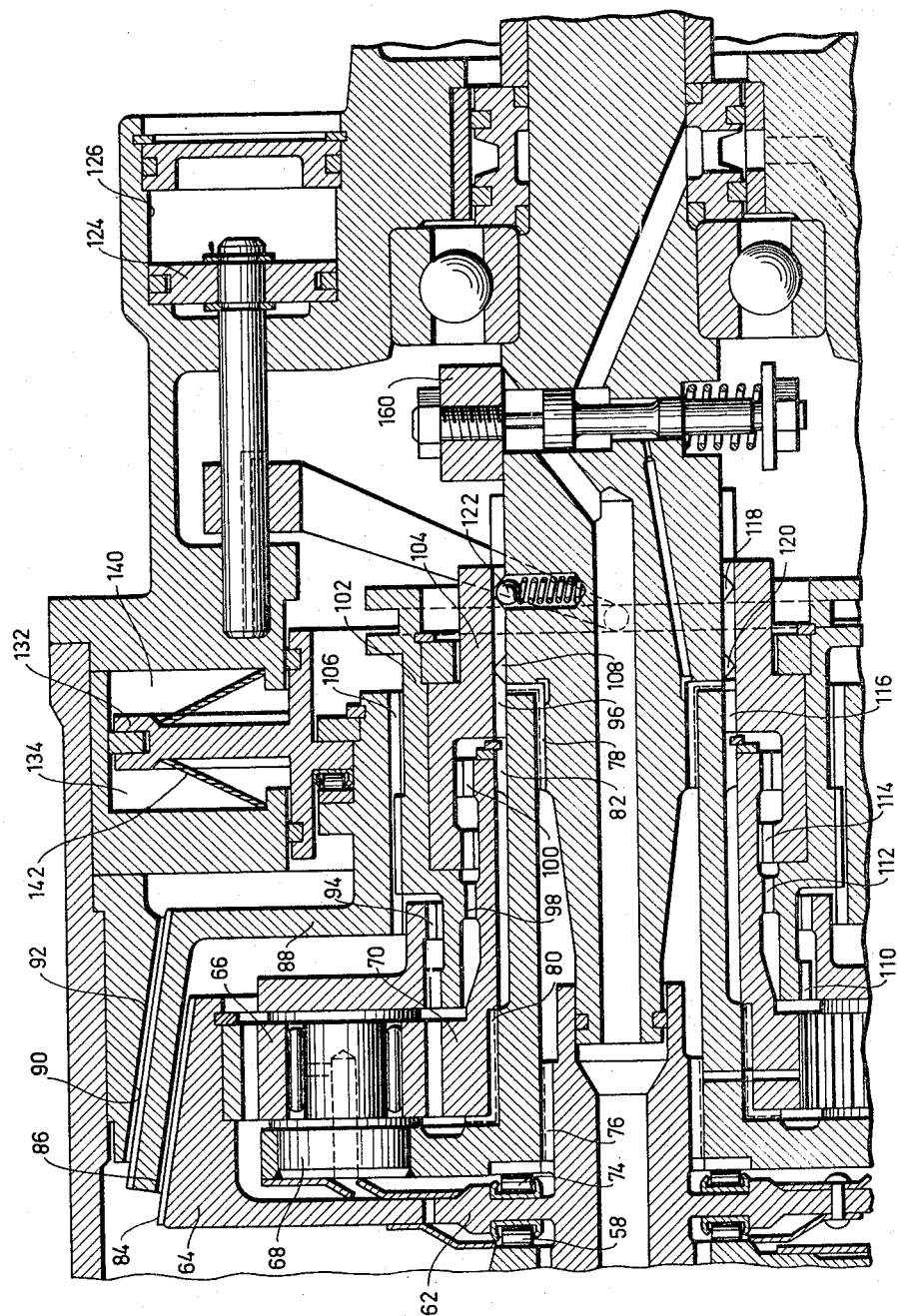

March 28, 1967 K. G. ÅHLEN 3,311,000
TRANSMISSION, PREFERABLY FOR VEHICLES
Filed Sept. 19, 1963 11 Sheets-Sheet 3

INVENTOR
Karl Gustav Åhlen
BY
ATTORNEY

March 28, 1967  K. G. ÅHLEN  3,311,000
TRANSMISSION, PREFERABLY FOR VEHICLES
Filed Sept. 19, 1963  11 Sheets-Sheet 4

INVENTOR
Karl Gustav Åhlen

BY
his ATTORNEY

March 28, 1967 K. G. ÅHLEN 3,311,000

TRANSMISSION, PREFERABLY FOR VEHICLES

Filed Sept. 19, 1963 11 Sheets-Sheet 5

INVENTOR

Karl Gustav Åhlen

BY his ATTORNEY

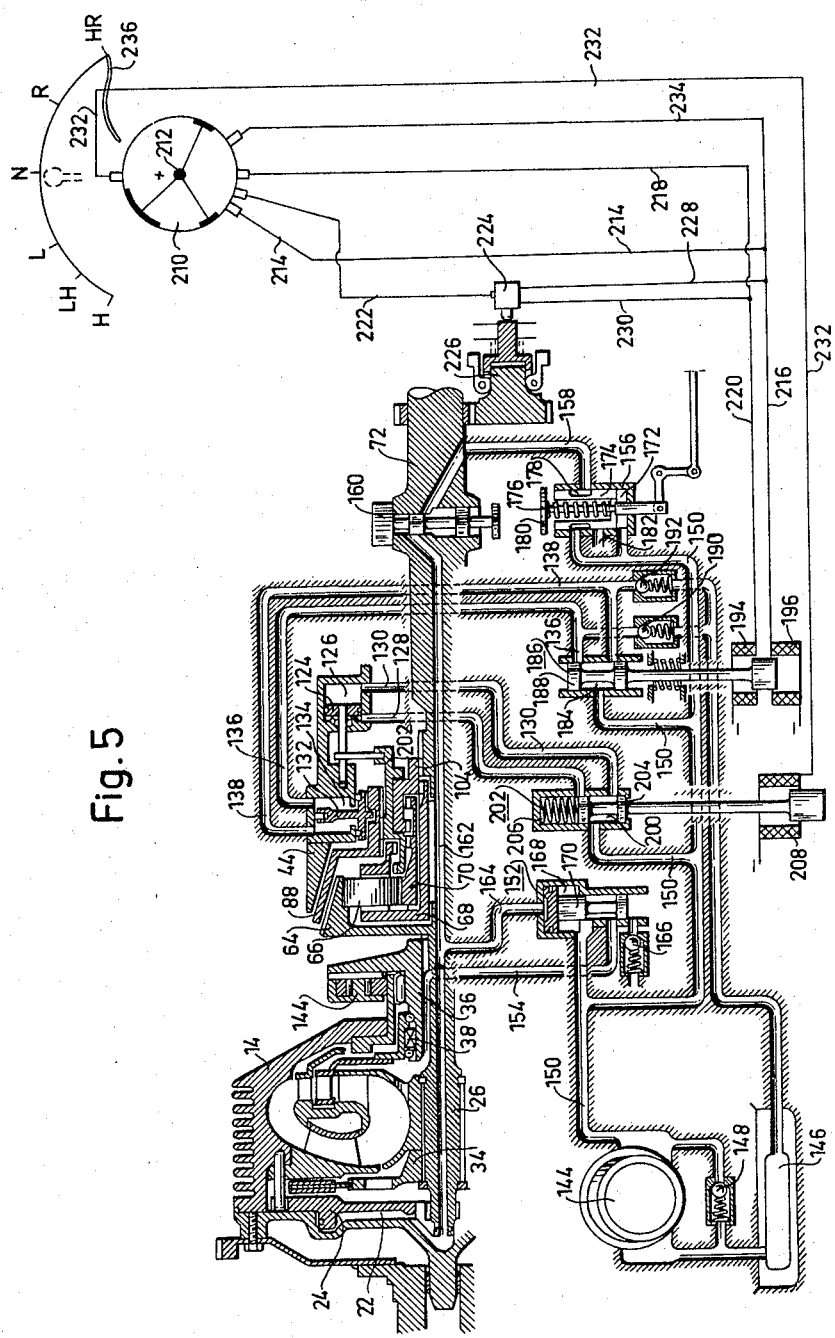

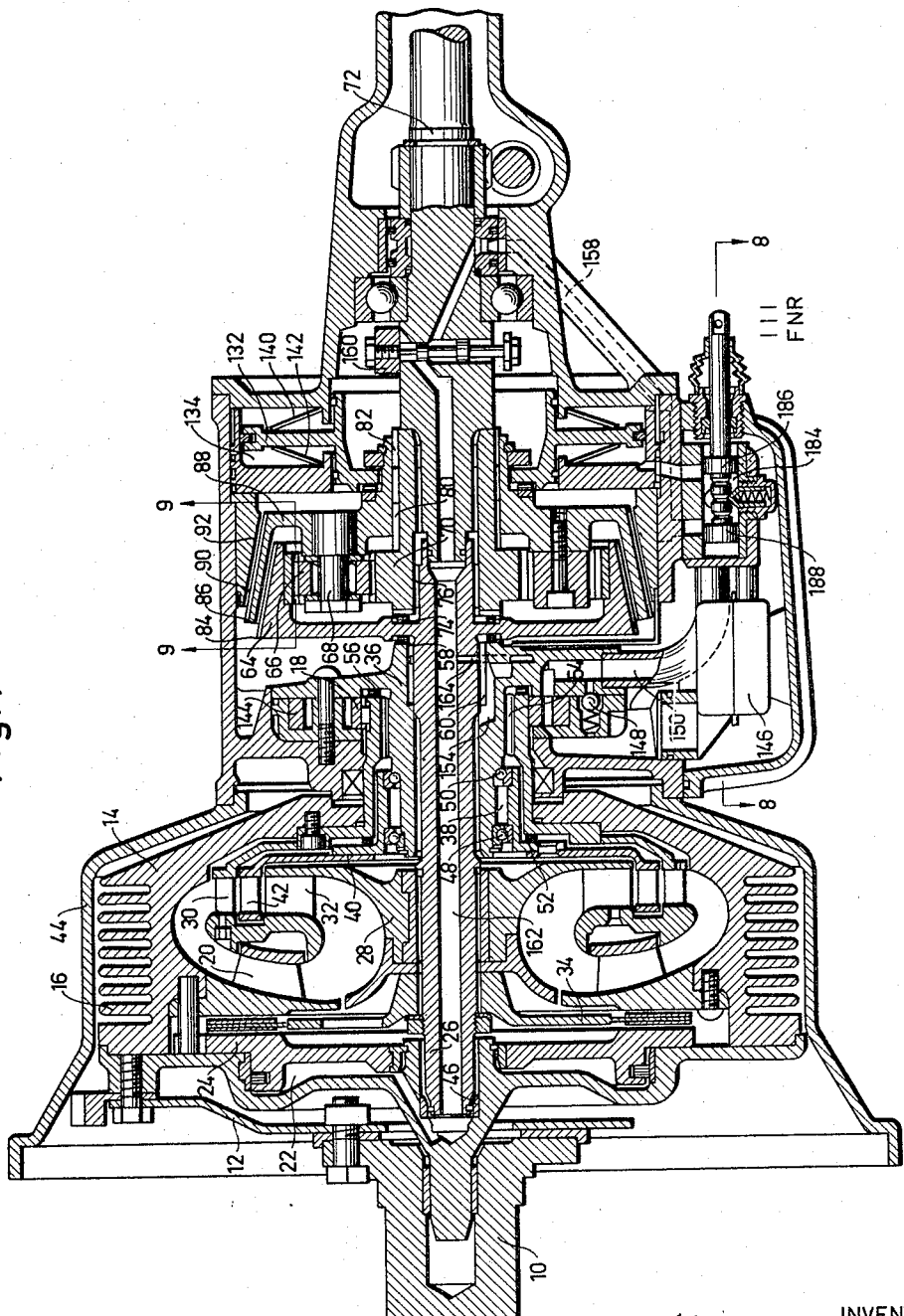

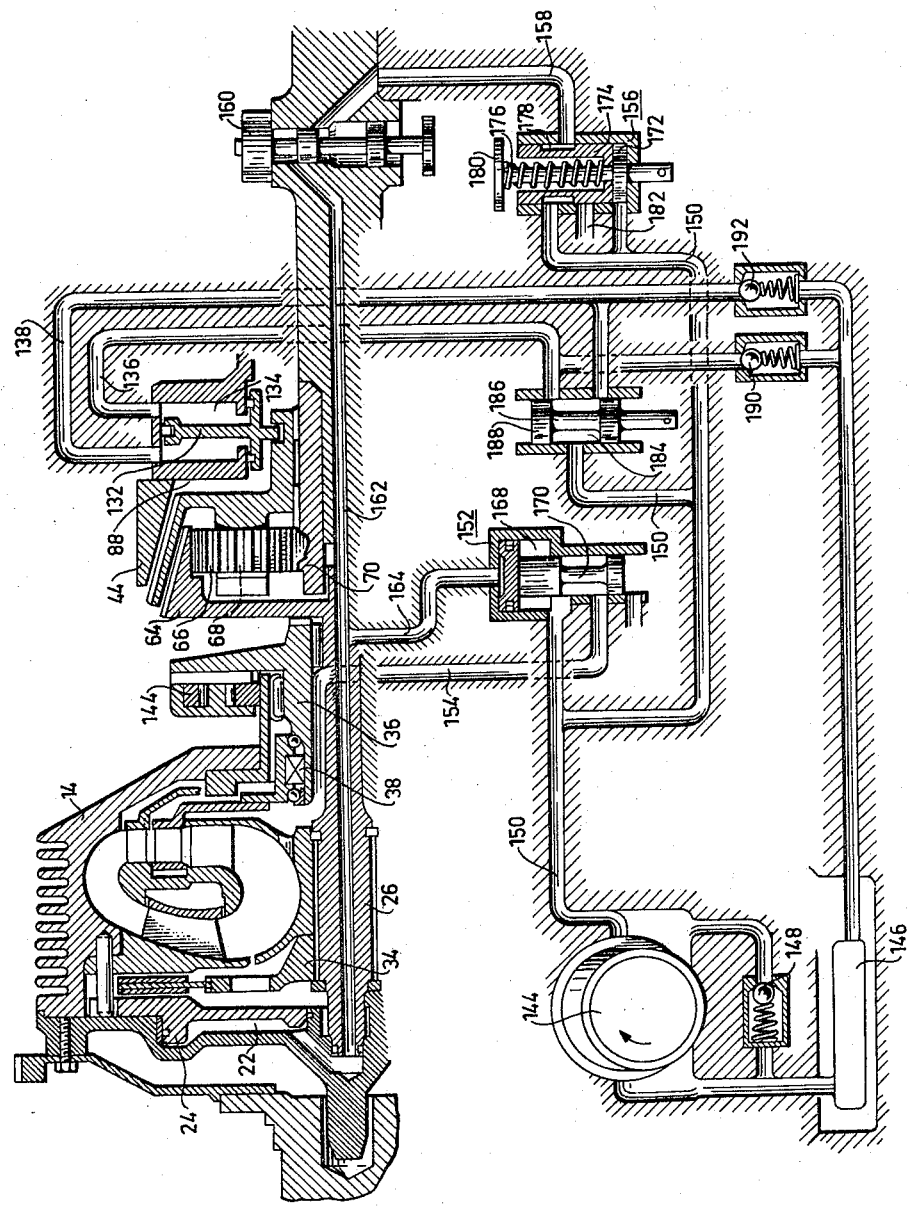

March 28, 1967     K. G. ÅHLEN     3,311,000
TRANSMISSION, PREFERABLY FOR VEHICLES
Filed Sept. 19, 1963     11 Sheets-Sheet 10

INVENTOR
Karl Gustav Åhlen
BY
James C. Mahee
his ATTORNEY

March 28, 1967 K. G. ÅHLEN 3,311,000
TRANSMISSION, PREFERABLY FOR VEHICLES
Filed Sept. 19, 1963 11 Sheets-Sheet 11

INVENTOR
Karl Gustav Åhlen
BY
his ATTORNEY

United States Patent Office 3,311,000
Patented Mar. 28, 1967

3,311,000
TRANSMISSION, PREFERABLY FOR VEHICLES
Karl Gustav Åhlen, Stockholm, Sweden, assignor, by mesne assignments, to S.R.M. Hydromekanik Aktiebolag, Stockholm, Sweden, a joint-stock company of Sweden
Filed Sept. 19, 1963, Ser. No. 310,075
Claims priority, application Sweden, Sept. 21, 1962, 10,148/62
24 Claims. (Cl. 74—763)

The present invention relates to a special type of reverse gear primarily intended for vehicles and particularly adapted for combination with a hydrodynamic torque converter.

Automobiles are normally provided with modern high speed internal combustion engines as prime movers. These high speed internal combustion engines have a torque characteristic in dependence of the speed, which is quite different from the torque characteristic which is desirable for the driving of a vehicle. For this reason a transmission for torque conversion must always be provided between the engine and the driving shaft of the vehicle. Hydrodynamic torque converters have proved to be eminently well adapted to this torque conversion, but also have the weakness that the torque multiplication is too low, at least in certain combinations of vehicles and engines, when the speed ratio between the driving shaft of the vehicle and the shaft of the engine is low and have for this reason to be combined with a mechanical gear, which gear is also necessary for obtaining a reverse drive.

Locomotives and other rail vehicles are also often provided with transmissions including a hydrodynamic torque converter in order to get a very high torque multiplication. Such rail vehicles must, however, be provided with reverse gears which give the vehicles at least about the same speed independent of the direction of movement. In order to further increase the torque multiplication at low speeds with a constant maximum speed or to maintain the torque multiplication at low speeds and to increase the maximum speed it has proved to be useful to design the reverse gear in such a way that it also can be used as a two speed gear.

The present invention has for its aim to provide a transmission comprising a planet gear of a new type and suitably also a hydrodynamic torque converter. Furthermore the invention includes a new control system for the planet gear which advantageously may be combined with the hydraulic system of a hydrodynamic torque converter.

Further objects and advantages of the invention will be apparent from the following description taken in conjunction with the accompanying drawings wherein:

FIG. 1a is an enlarged fragmentary sectional view of a portion of the structure shown in FIG. 1.

FIG. 5 shows a diagrammatic simplification of FIG. 1 and the control system for the transmission.

FIG. 7 shows a longitudinal section through another embodiment of the invention.

FIG. 10 shows a diagrammatic simplification of FIG. 7 and the control system for the transmission.

Figure 1:
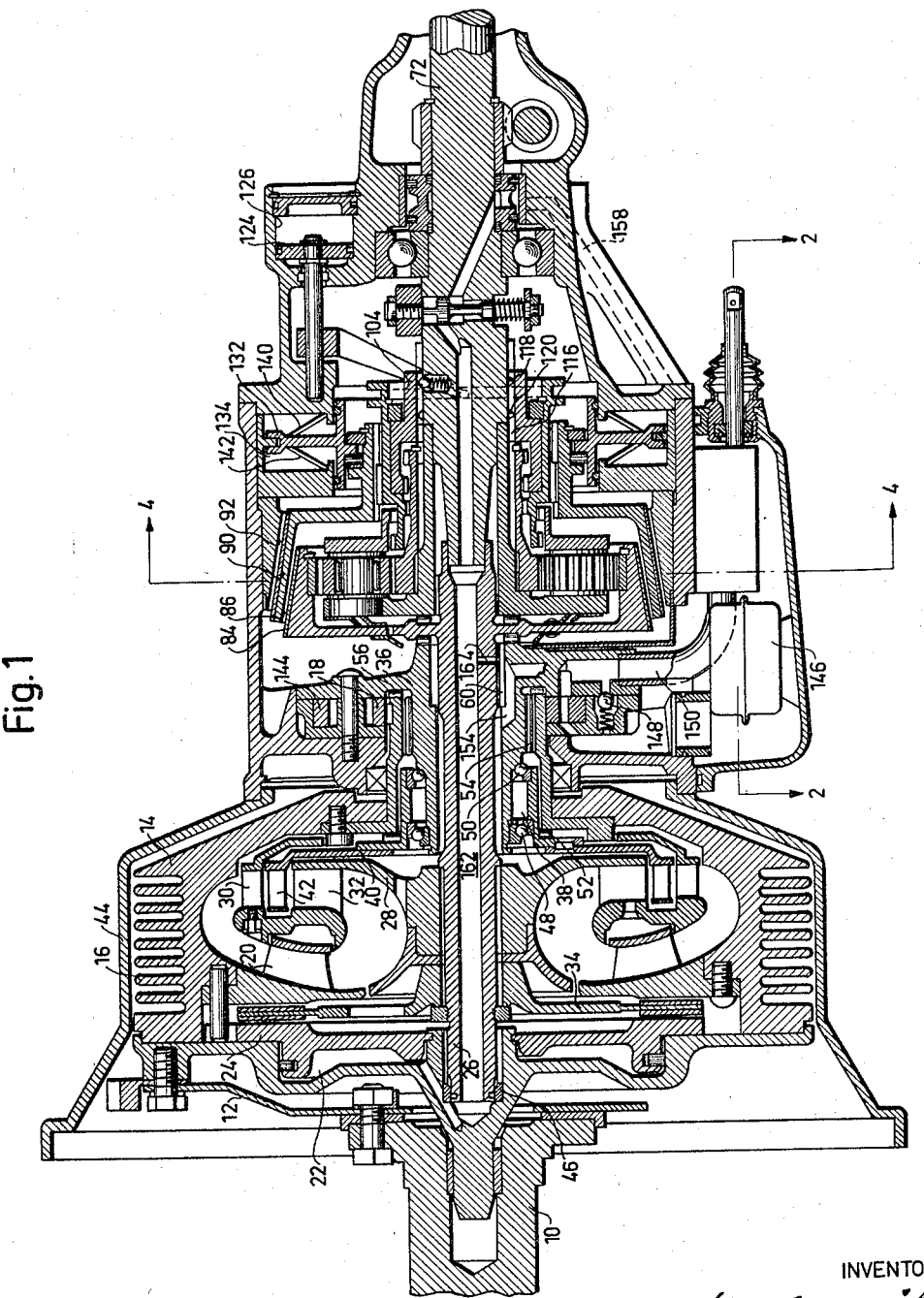
FIG. 1 shows a longitudinal section through an embodiment of a transmission according to the invention.
Figure 2:
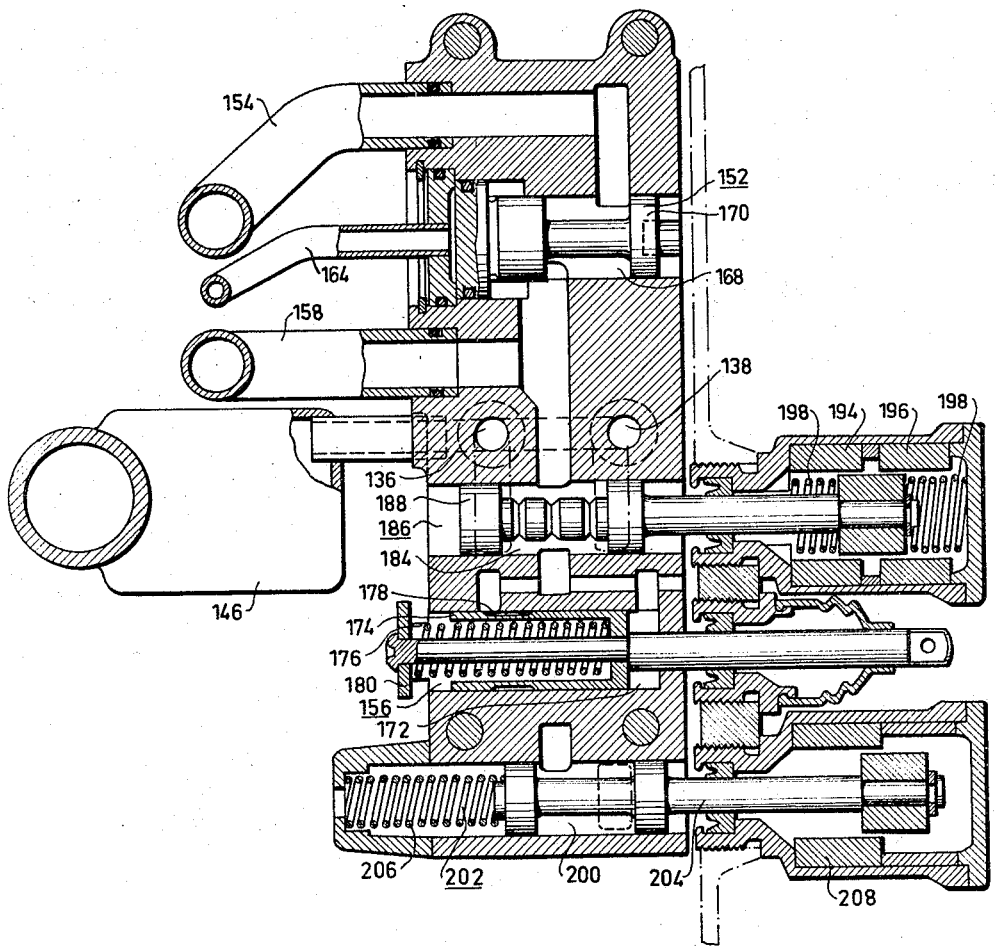
FIG. 2 shows a fragmentary section along the line 2—2 in FIG. 1.
Figure 3:
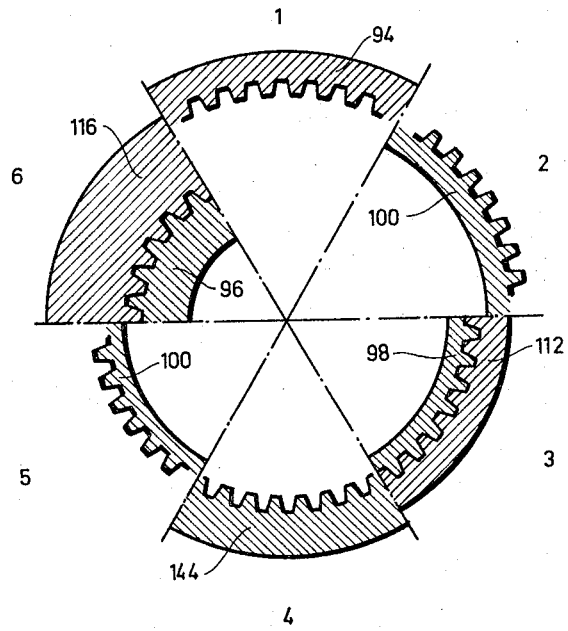
FIG. 3 shows in one and the same figure segments of six different sections denoted with the numerals 1, 2, 3, 4, 5 and 6 in FIG. 1.
Figure 4:
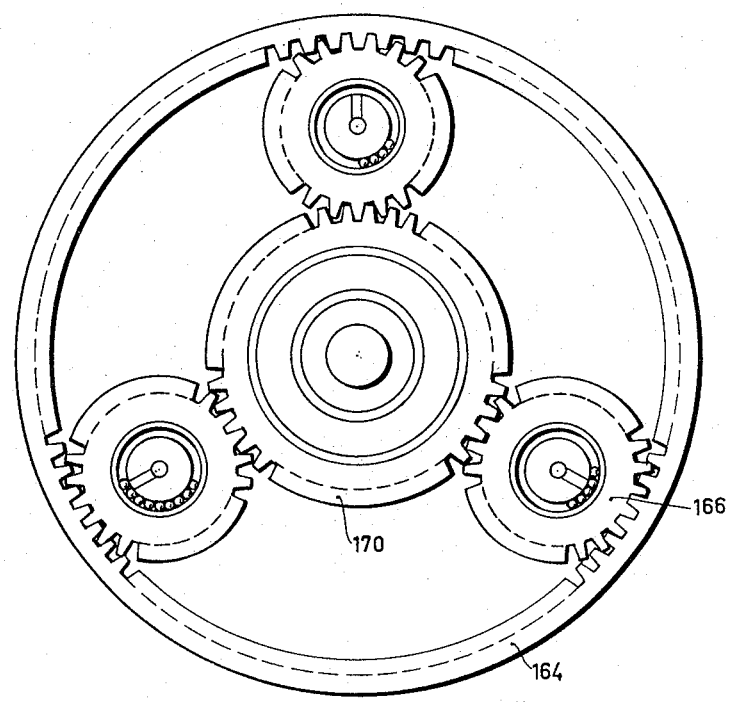
FIG. 4 shows a cross section along the line 4—4 in FIG. 1.

In the transmission shown in FIGS. 1–4 and diagrammatically indicated in FIG. 5, 10 is a shaft driven by an engine not shown, which shaft is non-rotatably connected with a rotating casing 14 of a hydrodynamic torque converter by means of a connecting plate 12. This casing carries a ring of pump blades 20 and is provided with cooling flanges 16 for cooling preferably as stated in the U.S. Patent 2,611,248 and a toothed rim 18, besides the casing which comprises a hydraulic working chamber preferably of the type stated in the U.S. Patent 2,690,054.

A chamber 22 is further provided in the casing, in which chamber a hydraulically operated piston 24 is non-rotatably located. A turbine shaft 26, coaxial with the driving shaft 10, carries a turbine disk 28 located within the casing, which turbine disk 28 carries two rings of turbine blades 30, 32. The turbine shaft 26 is further provided with a clutch plate 34, non-rotatable in relation to the turbine shaft, which clutch plate 34 is located between the hydraulically operated piston 24 and a seat in the casing. A quill-type reaction shaft 36 is stationarily provided coaxial with the turbine shaft 26 and carries by means of a free wheel 38 a reaction disk 40 with a ring of reaction blades 42. The different blades are preferably shaped as stated in U.S. Patent 2,690,053. The different shafts 10, 26 and 36 and the rotating casing are journalled on each other and in a stationary casing 44 by means of bearings 46, 48, 50, 52, 54, 56, 58 and 60.

The turbine shaft 26 is further provided with a flange 62, which carries a ring gear 64, non-rotatably connected with the shaft. This ring gear is in permanent mesh with planets 66 provided on a planet carrier 68. The planets 66 are furthermore in permanent mesh with a sun gear 70. The planet carrier is mounted on the turbine shaft 26 and an output shaft 72 by means of bearings 74, 76 and 78, while the sun gear 70 is mounted on the planet carrier 68 by means of bearings 80 and 82.

The ring gear 64 includes an outer bevelled friction surface 84 provided for cooperation with a complementary friction surface 86 on an axially slidable intermediate part 88. This intermediate part furthermore includes a second bevelled friction surface 90 provided for cooperation with a complementary friction surface 92 connected with the stationary casing 44. The planet carrier 68 is furthermore provided with two toothed rims 94 and 96 and the sun gear 70 is in the same way provided with two toothed rims 98 and 100. The clutch members 102 and 104 are axially fixed but rotatable in relation to each other. One of those members 102 is non-rotatably but axially slidably connected with the intermediate part 88 by means of splines 106 while the other member 104 is non-rotatably but axially slidably connected with the output shaft 72 by means of splines 108. The clutch member 102 is provided with two toothed rims 110 and 112 and the clutch member 104 is in the same way provided with two toothed rims 114 and 116 and a locking device comprising two grooves 118 and 120 and a ball 122 radially movable in the output shaft 72 for axial fixation of the clutch members in one of two determined axial positions in relation to the output shaft 72 and by that in relation to the planet carrier 68 and the sun gear 70.

The toothed rims 94, 96, 98, 100, 110, 112, 114 and 116 and the grooves 118 and 120 are axially so located in relation to each other that, when the ball 122 is pushed into the groove 118, the toothed rim 96 meshes with the rim 116 and the rim 98 meshes with the rim 112, while the rims 94, 100, 110 and 114 are free, whereby the planet carrier 68 is non-rotatably connected with the output shaft 72 and the sunwheel 70 is non-rotatably connected with the intermediate part 88, and that, when the ball 122 is pushed into the groove 120 the toothed rim 94 meshes with the rim 110 and the rim 100 with the rim 114, while the rims 96, 98, 112 and 116 are free, whereby the planet carrier 68 is non-rotatably connected with the intermediate part 88 and the sun gear 70 is non-rotatably connected with the output shaft 72.

The clutch member 102 and by that also the clutch member 104 are axially fixed to a piston 124 located in a cylinder 126 provided on opposite sides of the piston with channels 128 and 130 for supplying and carrying off of a pressure fluid, whereby the piston 124 moves the clutch member 104 in such a way that the ball 122 is pushed into one of the grooves 118 and 120.

The intermediate part 88 is axially fixed to a second piston 132 located in a second cylinder 134 comprising on opposite sides of the piston 132 channels 136 and 138 for supplying and carrying off of pressure fluid and two springs 140 and 142 located on opposite sides of the piston 132 to keep the piston in a middle position, when no pressure fluid is supplied. The middle position of the piston 132 corresponds to a neutral position of the intermediate part 88, in which neither of its friction surfaces 86 and 90 are in engagement with the corresponding friction surfaces 84 and 92 on the ring gear 64 and the stationary casing 44, respectively. Supply of pressure fluid to one side of the piston 132 causes the intermediate part 88 to be moved to a position for direct contact between the friction surfaces 84 and 86 and supply of pressure fluid to the other side of the piston causes the intermediate part 88 to be moved to a position for direct contact between the friction surfaces 90 and 92.

The toothed rim 18 of the rotating casing 14 drives a pump 144, which feeds oil from an oil sump 146 to the working chamber of the torque converter, to the pressure chamber 22 of the direct drive clutch and to the chambers 126 and 134 for the pistons 124 and 136, respectively, for adjustment of the planet gear. The high pressure and low pressure sides of the pump are connected by means of a maximum pressure valve 148.

The oil is conducted through a channel 150 from the pump 144 to a valve and distribution unit. A valve 170 in this distribution unit 152 is provided for adjustment of the supply of oil through a channel 154 to the working chamber of the torque converter. This valve 170 will be described in more detail later on.

A blocking valve 156 is further provided for the supply of oil through a channel 158 to a centrifugal regulator 160 provided in the output shaft 72, from which regulator the oil is conducted to the chamber 22 for the direct drive clutch through a channel 162.

A branching channel 164 is provided from the channel 162 to the valve 152 for adjustment of the valve for breaking the connection between the channels 150 and 154 and for connecting the channel 154 with the oil sump via a maximum pressure valve 166.

The valve 152 is provided with a cylinder 168 with the two parts into each other, while the channel 154 and ton 170 in order to carry out this purpose. The branching channel 164 communicates with the cylinder 168 at the end thereof having the larger diameter and the channel 150 communicates with the cylinder at the transition of the two ports in each other, while the channel 154 and the maximum pressure valve 166 communicate with the cylinder in the part thereof having the smaller diameter in such a way that the channel 154 is located more adjacent to the part of the cylinder having the bigger diameter than the valve 166.

The blocking valve 156 is provided with a cylinder 172 and a piston 174, which piston by means of a spring 176 is pressed in the direction towards one end of the cylinder 172, with which end a first branch of the channel 150 communicates, so that pressure oil is supplied between the two parts into each other, while the channel 154 and the piston 174 with the spring 176 pressed together is normally kept in its outer end position. A second branch of the channel 150 communicates with the cylinder 172 near its opposite end and is in communication with the channel 158 through a groove 178 in the piston when the piston is in its outer end position. The end of the spring 176 opposite to that facing the piston 174 is pressed against a stop 180 which is connected with the power control of the engine driving the transmission in such a way that the stop 180 is pressed in the direction towards the piston 174, when the power of the engine increases, whereby the tension of the spring 176 is increased.

On the assumption that the pressure in the channel 150 is below a fixed value, the piston 174 will be pushed to an inner end position in which the piston 174 blocks the second branch of the channel 150 and through the groove 178 forms a communication between the channel 158 and the sump 146 through a channel 182.

The channel 150 has a further branch communicating with the cylinder 184 of a selecting valve 186, which valve is provided with a piston 188 for alternate or simultaneous supply of pressure fluid to the cylinder 134 on opposite sides of the piston 132 through the channels 136 and 138, respectively. The channel 136 furthermore communicates with the sump 146 through a maximum pressure valve 190 and the channel 138 in the same way communicates with the sump 146 through another maximum pressure valve 192. The valve 192 is adjusted for a considerably higher pressure, for instance 10 kg./sq. cm. than the valve 190, which for instance is adjusted for 4–6 kg./sq. cm. This causes a higher pressure between the friction surfaces 90 and 92 than between the friction surfaces 84 and 86 and also causes when the stop 180 is brought nearer the piston 174 that the spring 176 is not able to displace the piston from its outer end position as long only the channel 138 communicates with the channel 150 through the selecting valve 186. The piston 188 is slidable between and also kept in either one of its two end positions, in which one of the channels 136 and 138 communicates with the channel 150 by the action of one of two solenoids 194 and 196. When both the solenoids are currentless the piston 188 is kept in its middle position by means of a spring device 198. In this middle position the channel 136 as well as the channel 138 communicates with the channel 150.

The channel 150 has a further branch communicating with the cylinder 200 of a distributing valve 202, which is provided with a piston 204 for reciprocal supply of pressure fluid to the cylinder 126 on both sides of the piston 124 through the channels 128 and 130, respectively.

The piston 204 is normally pushed to and kept in the end position, in which the channel 150 communicates with the channel 130 by means of a spring 206. By means of a solenoid 208 the piston 204, however, may be moved to and kept in its other end position, in which the channel 150 communicates with the channel 128.

For the actuation of the solenoids 194, 196 and 208 there is a manually operated switch 210, which may be adjusted into six different positions. In position N the flow of current through the switch 210 is broken and the solenoids 194, 196 and 208 are currentless. In position L an electric wire 212 from a source of current is in contact with a wire 214, which is connected with the wire 216 to the solenoid 196. In position H the wire 212 is in contact with a wire 218, which is connected with the wire 220 to the solenoid 194. In position LH the wire 212 is in contact with a wire 222 to a second switch 224, which by means of a centrifugal regulator 226 driven by the output shaft 72 connects the wire 222 either with the wire 228, which is connected with the wire 216 to the solenoid 196, or with the wire 230, which is connected with the wire 220 to the solenoid 194.

In position R the wire 212 is in contact with a wire 232 to the solenoid 208 as well as with a wire 234, which is connected with the wire 216 to the solenoid 196. In position HR finally, in which the switch is pressed against an elastic stop 236, the wire 212 is in contact with the wire 232 as well as with the wire 218.

The transmission works in the following way. When the switch 210 is in position N, the solenoids 194, 196 and 208 are currentless.

The piston 204 is therefore kept in the end position where it opens a connection between the channels 150 and 130, whereby the piston 124 is kept in the end position, where the clutch member 102 and by that the intermediate part 88 is non-rotatably connected with the sun gear 70 by means of the toothed rims 112 and 98 and the clutch member 104 and by that the output shaft 72 is non-rotatably connected with the planet carrier 68. The piston 188 is furthermore kept in its middle position and pressure liquid from the pump 144 is supplied through the two channels 136 and 138 to the cylinder 134. The fluid pressure in the system is then determined by the valve 190. In this way the piston 132 is kept in its middle position and the intermediate part 88 in its neutral position so that no torque can be transmitted through the planet gear 64, 66, 68 and 70 and thus no torque can be transmitted through the transmission as a whole. The transmission is thus brought into its neutral position.

By putting the switch 210 in the position L or possibly in the position LH if the speed of the output shaft is so low, that the centrifugal regulator 226 keeps the switch 224 in position for connection of the wires 222 and 228, the wire 212 is connected with the wire 216 and the solenoid 196 is switched on.

In this way the piston 188 is brought to the end position in which the channel 150 communicates with the channel 138 but not with the channel 136. The fluid pressure in the system then increases to a value determined by the valve 192, and the piston 132 is pushed to the end position, where the intermediate part 88 is non-rotatably connected to the stationary casing 44 by means of the friction surfaces 90 and 92. In this way the sun gear 70 is secured against rotation and the planet gear 64, 66, 68, 70 is adjusted for multiplication of the torque transferred from the turbine shaft 26 to the output shaft 72. The transmission is thus adjusted for maximum torque multiplication in the hydraulic torque converter as well as in the planet gear.

When the number of revolutions of the output shaft 72 increases, the centrifugal regulator 160 opens and connects the chamber 22 with the pump 144 at the same time as the pressure in the working chamber of the torque converter is brought down to a value determined by the maximum pressure valve 166. The transmission is then adjusted for torque conversion only in the planet gear.

By putting the switch 210 in position H or possibly, if it is in position LH, by increasing the number of revolutions of the output shaft 72 so that the centrifugal regulator 226 keeps the switch 224 in position for connection of the wires 222 and 230, the wire 212 is connected with the wire 220 and the solenoid 194 is switched on, at the same time as the solenoid 196 is switched off. Hereby the piston 188 is brought to the end position in which the channel 150 communicates with the channel 136 but not with the channel 138. The fluid pressure in the system hereby decreases to the value determined by the valve 190, and the piston 132 is pushed to the end position where by means of the friction surfaces 84 and 86 the intermediate part 88 is non-rotatably connected with the ring gear 64 and by that with the turbine shaft 26. As the intermediate part 88 already is connected with the sun gear 70, the planet gear rotates as a unit without torque conversion therein.

Owing to the fact that the output shaft 72 is connected to the planet carrier 68 and that the sun gear 70 is non-rotatably connected with the intermediate part 88 the torque transmitted by the intermediate part is at a minimum, and the force necessary for keeping the friction surfaces together is very low as the friction surfaces are formed with big diameters. The transmission is now adjusted for torque conversion in the hydraulic torque converter, while power transmission through the planet gear occurs without torque multiplication.

When the number of revolutions of the output shaft 72 increases, the centrifugal regulator 160 opens and connects the chamber 22 with the pump 144 at the same time as the pressure in the working chamber of the torque converter is brought down to the value determined by the maximum pressure valve 166. The transmission is now adjusted for direct drive. By moving the power control of the engine driving the transmission to the position for maximum power the spring 176 will be compressed and the piston 174 will against the action of the liquid pressure which by means of the maximum pressure valve 190 is kept at a comparatively low value be brought to the position where the channel 158 communicates with the channel 182 instead of with the channel 150. The chamber 22 will hereby be emptied independent of the position of the centrifugal regulator 160 so that the hydraulic drive is again engaged instead of direct drive.

By putting the switch 210 in position R at first the wire 212 is connected with the wire 232, whereby the solenoid 208 is switched on, and then the wire 212 is also connected with the wire 234, so that also the solenoid 196 is switched on. When the solenoid 208 is switched on, the piston 204 is pushed against the action of the spring 206 to the position, where the channel 150 communicates with the channel 128 but not with the channel 130. Now the piston 124 is pushed to its second end position, and the clutch member 102 is connected with the planet carrier 68 by means of the toothed rims 94 and 110, while the clutch member 104 is connected with the sun gear 70 by means of the toothed rims 114 and 100. When the solenoid 196 is then switched on, the intermediate part 88 will be connected with the stationary casing 44, as said above, whereby the planet carrier 68 is locked against rotation and the planet gear is adapted for reverse drive.

If the switch 210 is then further moved to the position HR, where it must be kept against the action of the spring 236, the connection between the wires 212 and 232 is uninterruptedly maintained, whereby the clutch members 102 and 104 are kept in unaltered positions, while the connection between the wires 212 and 234 is broken and substituted by a connection between the wires 212 and 218, whereby as said above the intermediate part 88 is moved to the position, where it is non-rotatably connected with the ring gear 64. The planet gear is now adjusted for direct drive.

By adjustment of the switch 210 between the positions R and HR shifting between forward and reverse drive may occur rapidly only by means of changement of friction connections. This device therefore makes fast shiftings between forward and reverse drive possible, which may sometimes be necessary for start on slippery ground.

Figure 6:
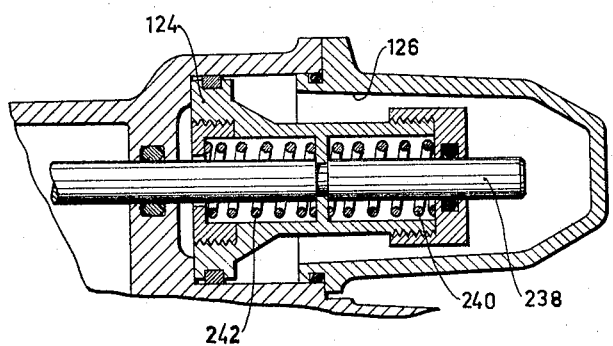
FIG. 6 shows a modification of a detail in FIG. 1.

FIG. 6 shows a modification of the piston 124 and its cylinder 126, in which the piston 124 is axially fixed to its bar 238 only by means of springs 240 and 242, whereby the piston 124 may be moved between its end positions, while the intermediate part 88 is connected with one of the ring gear 64 and the stationary casing 44, which means torque conversion through the clutch members 102 and 104 and their toothed rims. As soon as the intermediate part 88 is moved to its neutral position, the one of the springs 240, 242, which is compressed will move the bar 238 in such a way that the clutch members 102 and 104 are moved, before the torque conversion through the transmission is again connected.

In order to make a so called push start possible it is further suitable to provide the transmission with a second pump connected in parallel with the pump 144 and driven by the output shaft, which second pump can supply the hydraulic system with enough pressure for adjusting the transmission for torque transmission.

In FIGS. 7–10 a simpler embodiment of a transmission according to the invention is shown. This transmission differs from the embodiment shown in FIGS. 1–6 only by omitting the clutch members 102 and 104, and the fact that the planet carrier 68 is firmly connected with the output shaft 72, whereby the planet gear only may be adjusted for forward drive or reverse drive. The regulation system is therefore also considerably simplified. Correspondingly and/or similarly constructed details have been given the same members in these figures as in FIGS. 1–6.

Figure 9:
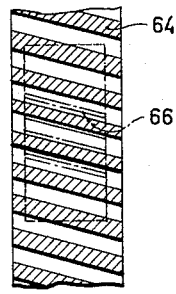
FIG. 9 shows a fragmentary section along the line 9—9 in FIG. 7.
Figure 8:
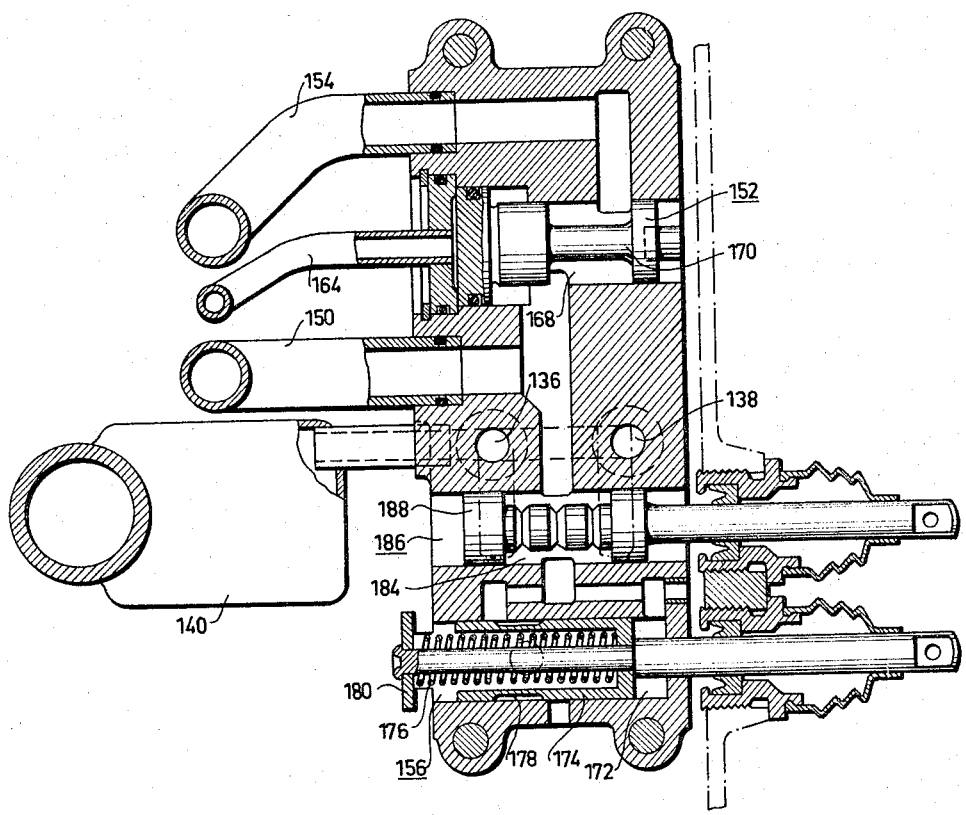
FIG. 8 shows a fragmentary section along the line 8—8 in FIG. 7.

In FIG. 9 is shown how the planets 66 and the ring gear 64 and by that the sun gear 70 may be constructed with helical teeth for decreasing the necessary contact force between the ring gear 64 and the intermediate part 88 produced by the piston 132.

The pistons 124 and 132 may of course, even if in the shown embodiments they have been shown hydraulically operated, also be operated in other ways, for instance by means of air under pressure or spring means shifting over from one end position to another.

Figure 11:
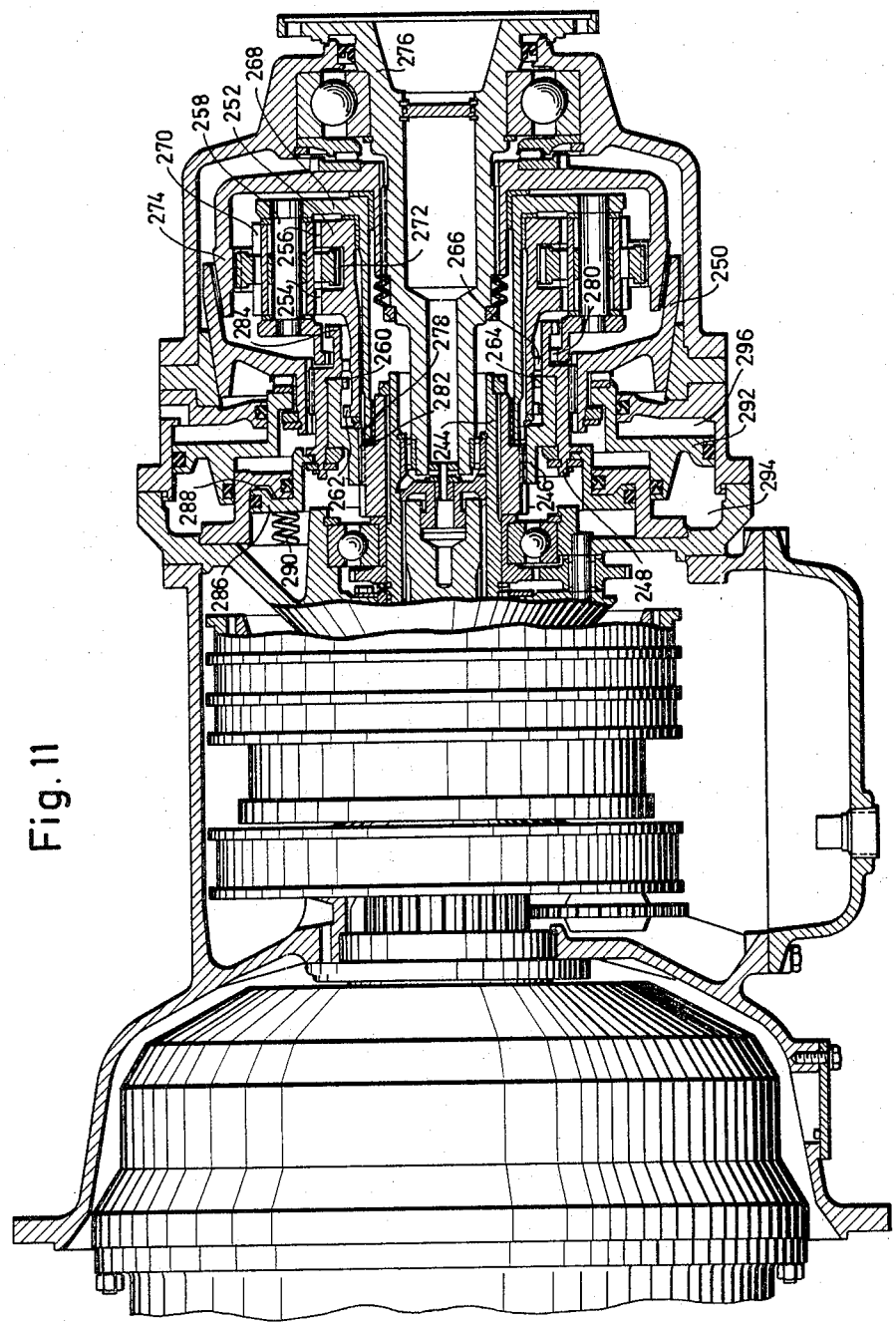
FIG. 11 shows a longitudinal section through a further embodiment of the invention.

In FIG. 11 a further embodiment of a transmission according to the invention is shown. This transmission differs from the one shown in FIG. 1 partly thereby that it comprises a hydrodynamic torque converter of a more complicated type shown in U.S. Patent 3,005,359 and comprising a double rotation stage as well as a single rotation stage, partly in the planet gear. The output shaft 244 of the torque converter is axially slidably but non-rotatably connected with a first clutch member 246 which is rotatably free from but axially fixed to a second clutch member 248 which is axially slidably but non-rotatably connected with an intermediate part 250. The sun gear member 252 of the planet gear is provided with two axially spaced toothed rims 254, 256 of the same diameter for cooperation with the planets 258 and with two toothed rims 260, 262 for cooperation with toothed rims 264 and 266 provided on the clutch members 246 and 248, respectively. The planet carrier 268 carries a set of planets 258. Each planet comprises a longer central portion provided with a toothed rim 270 and a shorter outer portion provided with a toothed rim 272 axially and non-rotatably fixed to the central portion in an axially centered position. The toothed rim 270 cooperates with the two rims 254, 256 of the sun gear 252 and the toothed rim 272 cooperates with a ring gear 274 which is non-rotatably and axially fixed to the output shaft 276 of the transmission. The relation between the radial distances of the pitch circles from the axis of the planet 258 to the toothed rims 270 and 272 is the same as the relation between the radial distances of the pitch circles from the axis of the transmission to the toothed rims 254, 256 of the sun gear and to the ring gear 274. The planet carrier 268 is further provided with two toothed rims 278, 280 for cooperation with toothed rims 282 and 284 provided on the clutch members 246 and 248, respectively. The clutch member 248 and by that also the clutch member 246 is axially fixed to a piston 286 sealingly cooperating with two annular walls of the casing so that a cylinder 288 is provided in which pressure may be supplied for moving the piston 286 to the left as shown in FIG. 11. In the other direction the piston 286 is pressed by a spring 290. In this way the clutch member may be put into either one of its end positions in one of which the toothed rims 278 and 282 as well as 262 and 264 are engaged with each other, and in the other one of which the toothed rims 260 and 264 as well as 280 and 284 are engaged with each other, and to a neutral position where all the toothed rims are free in relation to each other.

The intermediate part 250 is axially fixed to a second piston 292 located in a second cylinder 294, 296 of two stage type in the casing. By supplying pressure fluid to the cylinder portion 294 the piston 290 moves the intermediate part 250 into connection with the ring gear 274 and by supplying pressure fluid to the cylinder portion 296 the piston 290 moves the intermediate part 250 into connection with the stationary casing. The planet gear is thus controlled and operated in the same way as the planet gear shown in FIG. 1 except for the fact that the ring gear 274 is non-rotatably connected with output shaft 276 of the transmission instead of with the output shaft 244 of the torque converter, and that the planets are provided with two toothed rims 270, 272 instead of with one. In this way the planet gear acts as an overdrive instead of as a torque multiplying gear and gives a gear ratio in reverse drive of 1:1.

Figure 12:
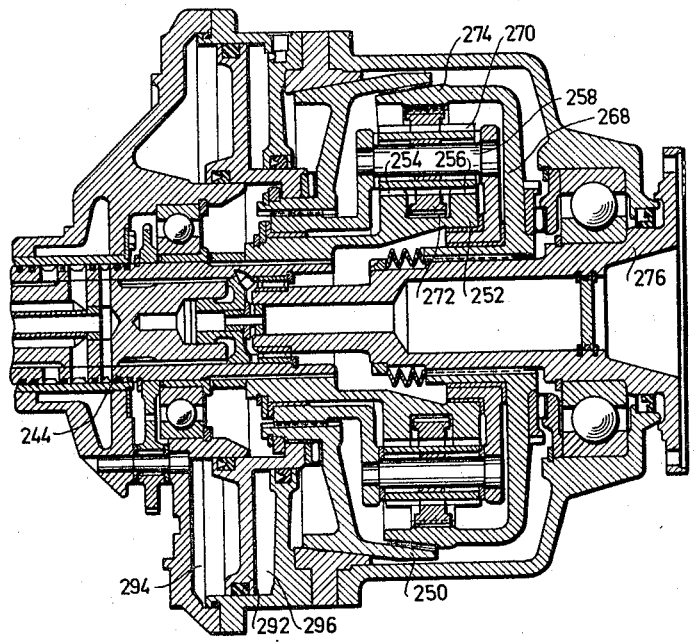
FIG. 12 shows a fragmentary longitudinal section through a modification of the transmission shown in FIG. 11.

FIG. 12 shows a simplification of FIG. 11 in exactly the same way as the embodiment shown in FIG. 7 is a simplification of the embodiment shown in FIG. 1. Correspondingly and/or similarly constructed details have been given the same numbers in FIG. 12 as in FIG. 11.

Figure 13:
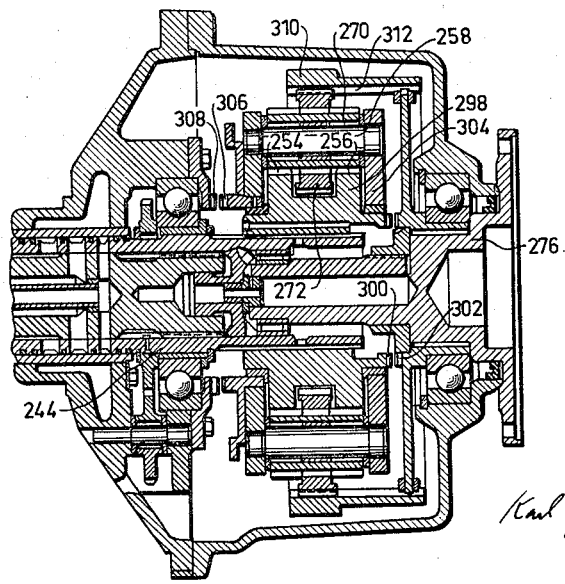
FIG. 13 shows a fragmentary longitudinal section through another modification of the transmission shown in FIG. 11.

FIG. 13 shows a planet gear of the same type as that in FIG. 12 except for the fact that the gear is provided with dog clutches instead of with friction clutches. The sun gear 298, however, is axially slidably mounted on the output shaft 244 of the torque converter and provided with a toothed rim 300 for cooperation with a toothed rim 302 on the output shaft 276. The planet carrier 304 is axially fixed to the sun gear 298 and provided with a toothed rim 306 for cooperation with a toothed rim 308 in the stationary casing. The ring gear 310 is provided with a long toothed rim 312 for constant mesh with the outer toothed rim 272 of the planets 258 independent of the axial position of the planet carrier 304 and the sun gear 298.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. A transmission for providing multiple forward drives and a reverse drive from an input shaft to an output shaft, said transmission comprising a three element planetary gearing having a ring gear, planet, and sun gear elements, said ring gear element being connected to the same one of said shafts in all drives, clutch means for connecting the other one of said shafts selectively to one or the other of the remaining elements of said planetary gearing, and clutch-brake means for selectively connecting the one or the other of said remaining elements, whichever is disconnected from said other one of said shafts in a first condition to a stationary member to permit rotation of the transmission elements relative to each other and in a second condition to said ring gear element to lock the transmission elements against rotation relative to each other.

2. A transmission for providing multiple forward drives and a reverse drive from an input shaft to an output shaft, said transmission comprising a three element planetary gearing having ring gear, planet, and sun gear elements, said ring gear element being connected to the same one of said shafts in all drives, clutch means for connecting the other one of said shafts selectively to one or the other of the remaining elements of said planetary gearing, and clutch-brake means having an axially movable member for selectively connecting the one or the other of said remaining elements, whichever is disconnected from said other one of said shafts in a first condition to a stationary member and in a second condition to said ring gear element, said clutch means comprising one part in constant non-rotational engagement with the axially movable member of said clutch-brake means and one part permanently connected to said other one of said shafts.

3. A transmission for providing multiple forward drives and a reverse drive from an input shaft to an output shaft, said transmission comprising a three element planetary gearing having ring gear, planet, and sun gear elements, said ring gear element being connected to the same one of said shafts in all drives, clutch means for connecting the other one of said shafts selectively to one or the other of the remaining elements of said planetary gearing, and clutch-brake means having an axially movable member for selectively connecting the one or the other of said remaining elements whichever is disconnected from said other one of said shafts in a first condition to a stationary member and in a second condition to said ring gear element, and actuating means for said movable member including means for automatically maintaining said movable member in a neutral intermediate position when said actuating means is inoperative.

4. A transmission as defined in claim 3 and including safety means permitting actuation of said clutch only when the axially movable member of said clutch-brake means is in a neutral intermediate position.

5. A transmission as defined in claim 1 and including means for automatic shifting between the different forward drives in response to variations in the speed of rotation of one of said shafts.

6. A transmission for providing multiple forward drives and a reverse drive from an input shaft to an output shaft, said transmission comprising a planetary gearing having a ring gear, planet gear and sun gear, said ring gear being permanently connected to one of said shafts, clutch means for selectively connecting the other of said shafts to said planet gear or said sun gear, clutch-brake means for selectively connecting said sun gear or said planet gear in a first condition to a stationary member and in a second condition to said ring gear, and a hydrodynamic torque converter connected to one of said shafts.

7. A transmission as defined in claim 1 in which each planet gear element comprises a three-part unitary gear rotatably mounted on a planet carrier, said unitary gear having a central part of one diameter and two outer parts of less diameter disposed on opposite sides of said central part, said central part being in constant mesh with said ring gear element, said outer parts being in constant mesh with said sun gear elements, the gear ratios being such that with the planetary stationary said sun gear and said ring gear will rotate at approximately the same speed but in opposite directions.

8. A transmission as defined in claim 7 in which the relation between the radii of the central and outer parts and the axis of said planet gear element is approximately equal to the relation between the radii of said sun and ring gears and the axis of said transmission.

9. A transmission as defined in claim 2 in which said clutch means comprises two clutch members for selectively connecting said other of the remaining elements of said planetary gearing to said other one of said shafts and said axially movable member and for connecting said other one of said shafts to said axially movable member.

10. A transmission as defined in claim 9 in which said clutch members are fixed against relative axial movement and are relatively rotatable.

11. A transmission as defined in claim 10 in which one of said clutch members is slidably and nonrotatably connected to said other one of said shafts and the other of said clutch members is slidably and non-rotatably connected to said axially movable member.

12. A transmission as defined in claim 11 in which said clutch members are of the dog clutch type and said clutch-brake means is of the friction type.

13. A transmission as defined in claim 9 in which a hydraulic control system is provided for operation of said clutch members and said clutch-brake means.

14. A transmission as defined in claim 13 in which said hydraulic system includes a cylinder, a piston in said cylinder connected to said clutch-brake means, a conduit connected to one end of said cylinder, a second conduit connected to the opposite end of said cylinder, and a selecting valve for selectively supplying pressure fluid to said first or second conduit.

15. A transmission as defined in claim 14 in which said hydraulic system includes a sump, a maximum pressure valve for one pressure connecting said first conduit and said sump, and a second maximum pressure valve for a different pressure connecting said second conduit and said sump, whereby the pressure applied to said piston will be different in opposite directions.

16. A transmission as defined in claim 14 and including a centrifugal regulator driven by the output shaft of said transmission, said regulator serving to control operation of said selecting valve.

17. A transmission as defined in claim 9 and including a hydrodynamic torque converter connected to said input shaft, a hydraulically operated direct drive mechanical clutch for driving said input shaft independently of said converter, a hydraulic motor for actuating said direct drive clutch, a channel for supplying pressure fluid to said motor, a blocking valve for controlling the supply of fluid to said channel, said blocking valve being normally retained in open position by the pressure of said fluid, and a further valve disposed in said channel and operable in response to the seat of rotation of said output shaft to control the flow of fluid to said motor, whereby said direct drive clutch is engaged in accordance with the speed of rotation of said output shaft.

18. A transmission as defined in claim 17 and including means for moving said blocking valve to close the position in accordance with an increase in power input to said transmission.

19. A transmission as defined in claim 14 in which said hydraulic system includes a second cylinder, a second piston in said second cylinder connected to said two clutch members, a third conduit connected to one end of said second cylinder, a fourth conduit connected to the opposite end of said second cylinder, a distribution valve for selectively supplying pressure fluid to said third or fourth conduit, and spring means for normally maintaining said distribution valve in a position to supply pressure fluid to one of said third or fourth conduits.

20. A transmission as defined in claim 19 and including first and second solenoids for actuating said selecting valve and a third solenoid for actuating said distribution valve.

21. A transmission as defined in claim 20 and including a manually operable multiple position switch connected to said solenoids for manually selecting all operating conditions of said planetary gearing.

22. A transmission for providing multiple forward drives and a reverse drive from an input shaft to an output shaft, said transmission comprising a three element planetary gearing having a ring gear, planet, and sun gear elements, said ring gear element being connected to the same one of said shafts in all drives, clutch means for connecting the other one of said shafts selectively to one or the other of the remaining elements of said planetary gearing, and clutch-brake means for selectively connecting the one or the other of said remaining elements, whichever is disconnected from said other one of said shafts, in a first condition to a stationary member to permit rotation of the transmission elements relative to each other and in a second condition to another one of said elements to lock the two connected transmission elements against rotation relative to each other, said clutch-brake means including an intermediate member separate from and movable relative to all three said elements, said intermediate member being movable between a first position whereat the member connects the said remaining disconnected element to another one of said elements, and a second position whereat the intermediate member connects the remaining disconnected element to the stationary member.

23. A transmission as defined in claim 22 wherein the said intermediate member is axially slidable between the said first and second positions.

24. A transmission as defined in claim 22 wherein the said clutch-brake means are interconnected in such a manner that the two remaining elements cannot simultaneously be connected to the stationary member.

References Cited by the Examiner

UNITED STATES PATENTS

| | | | |
|---|---|---|---|
| 1,248,370 | 11/1917 | Million | 74—792 |
| 1,896,440 | 2/1933 | Durig | 74—792 |
| 2,174,672 | 9/1939 | Soden-Frounhofen | 74—763 |
| 2,296,519 | 9/1942 | Griswold | 74—792 |
| 2,631,476 | 3/1953 | Ravigneaux | 74—759 |
| 2,884,812 | 5/1959 | Reis | 74—751 |

MARK NEWMAN, *Primary Examiner.*

DAVID J. WILLIAMOWSKY, *Examiner.*

J. R. BENEFIEL, *Assistant Examiner.*